Figure 1:
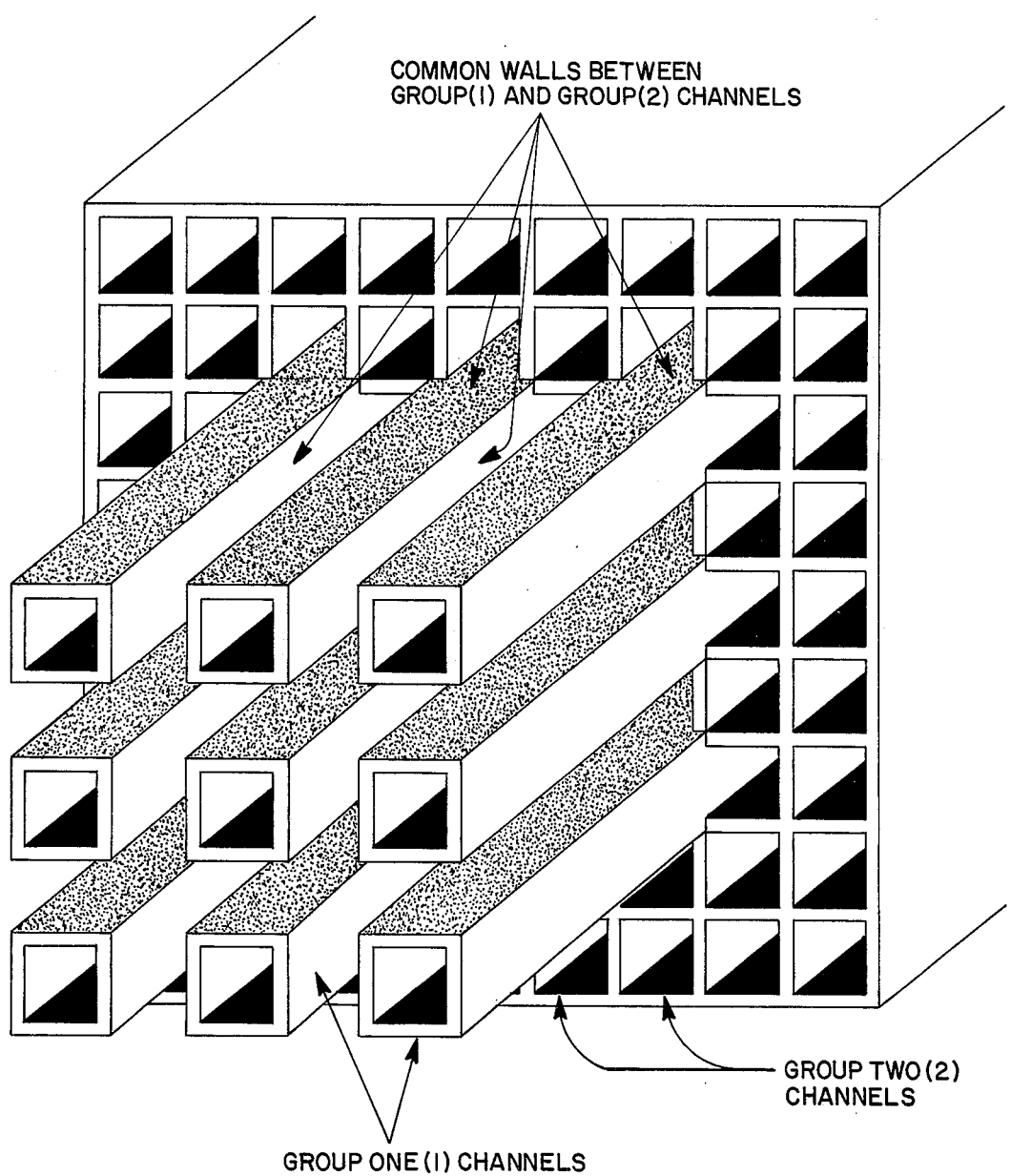

United States Patent [19]

Sweed et al.

[11] 4,101,287
[45] Jul. 18, 1978

[54] COMBINED HEAT EXCHANGER REACTOR

[75] Inventors: Norman H. Sweed, Princeton Jct.; John P. DeLuca, New Providence; Kenneth Kamholz, Cherry Hill, all of N.J.

[73] Assignee: Exxon Research & Engineering Co., Linden, N.J.

[21] Appl. No.: 761,495

[22] Filed: Jan. 21, 1977

[51] Int. Cl.² .......................... B01J 8/00; F28D 7/00; F28F 1/04
[52] U.S. Cl. .................................. 23/288 K; 23/285; 23/288 FC; 29/157.3 R; 165/165; 264/56; 252/477 R
[58] Field of Search ......... 23/288 K, 288 FC, 288 M, 23/288 R, 252 R, 283, 284, 285; 252/477 R; 165/165, 166; 423/116, 188; 264/56, 67; 29/157.3 R, 157.4

[56] References Cited

U.S. PATENT DOCUMENTS

| 3,499,797 | 3/1970 | Hooper | 23/288 R X |
|---|---|---|---|
| 3,849,076 | 11/1974 | Gryaznov et al. | 23/288 K X |
| 3,931,050 | 1/1976 | Asano et al. | 252/477 R X |
| 3,963,504 | 6/1976 | Lundsager | 252/477 R X |
| 3,982,981 | 9/1976 | Takao et al. | 23/288 R X |
| 3,983,283 | 9/1976 | Bagley | 23/288 FC X |
| 4,007,539 | 2/1977 | Nishio | 23/288 FC X |
| 4,041,591 | 8/1977 | Noll et al. | 165/165 X |
| 4,041,592 | 8/1977 | Kelm | 165/165 X |

FOREIGN PATENT DOCUMENTS 1,105,894  5/1961  Fed. Rep. of Germany ....... 165/165

Primary Examiner—Morris O. Wolk
Assistant Examiner—Roger F. Phillips
Attorney, Agent, or Firm—Joseph J. Allocca

[57] ABSTRACT

A one-piece, integral, high strength, combined heat exchanger-reactor comprising a monolithic honeycomb structure wherein the channels thereof are divided into two or more groups; group one carrying one fluid and group two carrying another fluid which differs from the first in composition and/or temperature and/or pressure and/or direction of flow, the main design feature of the combined heat exchanger-reactor (CHER) being that group one channels extend outward parallel to the channel axis and perpendicular to the cross-section of the honeycomb and each channel of this group one being in thermal contact through common walls with channels of group two while each channel of group one is separated from other channels of group one by the intervening voids formed by the presence of the channels of group two. The extended ends of the channels of group one extending from one or both ends of the honeycomb are manifolded at one or both ends so as to form a separation of the entrances and/or exits of the extended group one channels from the recessed group two channels thereby permitting the entry and/or exit of fluid in group one channels while preventing entry of the same fluid into the group two channels thereby permitting the independent passage of different fluids through the different channel one and channel two systems, the common wall which exists between channels of the different groups allowing heat conduction from the fluid in one group of channels to the fluid in the other group of channels. In this manner, very precise concentration and/or temperature control may be maintained over the fluids and/or catalysts which exist in the different channel groups, enabling one to perform complex reactions, either self-induced or catalytic, in the reactor with greatly enhanced yields and/or selectively due to the refined temperature and/or concentration control which is made possible by the present invention.

12 Claims, 4 Drawing Figures

END VIEW OF UNMANIFOLDED CHER

CROSS HATCHED WALLS TERMINATE IN THE PLANE OF THE PAPER WHILE THE UNMARKED WALLS TERMINATE ABOVE THE PLANE OF THE PAPER.

GROUP I CHANNELS TERMINATE ABOVE THE PLANE OF THE PAPER WHILE GROUP 2 CHANNELS TERMINATE IN THE PLANE OF THE PAPER.

TOP VIEW

SECTION A-A' OF FIGURE 3

COMBINED HEAT EXCHANGER REACTOR

High strength, lightweight, efficient and easily fabricated heat exchangers and catalytic reactors have long been sought by process engineers. Unfortunately, it has proved impossible or at least extremely difficult to create a single or monolithic structure embodying all the desirable characteristics needed while eliminating or minimizing disadvantageous properties. The literature contains many examples of attempts to achieve the desired goal.

PRIOR ART

U.S. Pat. No. 3,165,152 teaches a counterflow metal heat exchanger. The exchanger consists of sheets of triangularly corrugated material laminated together so as to form a series of roughly parallel passageways. In order for the exchanger to effectively function, the inlet area of the exchanger utilizes a highly complicated design feature characterized by detents and depressed crossflow passageways which effectively causes fluid flow blockage. Consequently, this heat exchanger possesses a high pressure drop. The method of construction recited in the patent and exemplified by the drawings utilize long metal welds or similar materials joining techniques resulting in a structure highly susceptible to internal rupture, leakage and uncontrolled fluid crossover. A feature of the instant invention is the degree of separation, structural integrity and isolation possessed by each of the outwardly extending channels of group one. Each channel in group one is completely separated from other channels in group 1, that is, each channel of group one is completely surrounded by channels of group two. By way of comparison, channels of the U.S. Pat. No. 3,165,152 patent which by design carry the same fluid, also share common walls and/or contact at vertices and/or contact a vertex with a channel wall thereby having two channels of the same group (for the purpose of this discussion, channels viewed as equivalent to our group one channels) in physical contact with each other. This results in an inefficient apparatus, one not fully utilizing the maximum heat transfer wall areas of the channels, to control the temperature of the fluids or transfer the maximum amount of heat from the fluids in one set of channels to the fluids in the other set of channels.

U.S. Pat. No. 3,849,076 described a reactor for carrying out conjugated, chemical, catalytic reactions comprising a hollow body, the inner space of which is subdivided into two compartments by a partition in the form of a set of two parallel plates coiled in a double spiral. The channels of group one are in continuous contact both with each other and with the channels of group two. The channels of group one constitute a continuous corrugated spiral which contacts channels of group two only through two common walls. A system such as this is inherently inferior to one in which a given channel (group one) is surrounded by a second channel system, i.e. every channel of group one being completely isolated from other channels of the same group.

U.S. Pat. No. 3,936,288 teaches a method for making a glass ceramic recuperator. In the patent, parallel sheet systems of channels are contacted with each other longitudinally. Each sheet system is angled at the end so as to be off parallel. The sheets are alternated so that the angled ends of any two adjacent sheets do not overlap so that the overall apparatus assumes the configuration of a double ended Y. The channels of each sheet form a complete system and will carry a single component, i.e. the channels of a given system will possess common walls with each other. Furthermore, the channels of system one and system two will be separated by at least a double thickness of material in conjunction with some weld or adhesive composition.

Again, it is clear that this apparatus is distinguishable from that of the instant invention in that the instant invention possesses a channel group (system one) wherein each channel is completely separated from the other channels of the same group. Furthermore, the channels of group one share all of their walls with channels of group two and the walls are only the thickness of one layer of material and are not constructed using weld or adhesive material of any kind.

THE INVENTION

This invention relates to a one-piece, integral high strength lightweight combined heat exchanger-reactor (CHER) consisting of a monolithic honeycomb structure wherein the channels of the honeycomb are divided into separate groups, group one channels carrying one fluid with group two channels carrying another fluid which differs from the first either by composition and/or temperature and/or pressure, and/or direction of flow, the main design feature of the combined heat exchanger-reactor (CHER) being that one group of channels extends outward from the honeycomb parallel to the direction of fluid flow in the honeycomb, each channel of the group one being in contact through common walls with channels in group two, each channel of group one being separated from other channels of group one by the intervening voids formed by the presence of the channels of group two.

Figure 2:
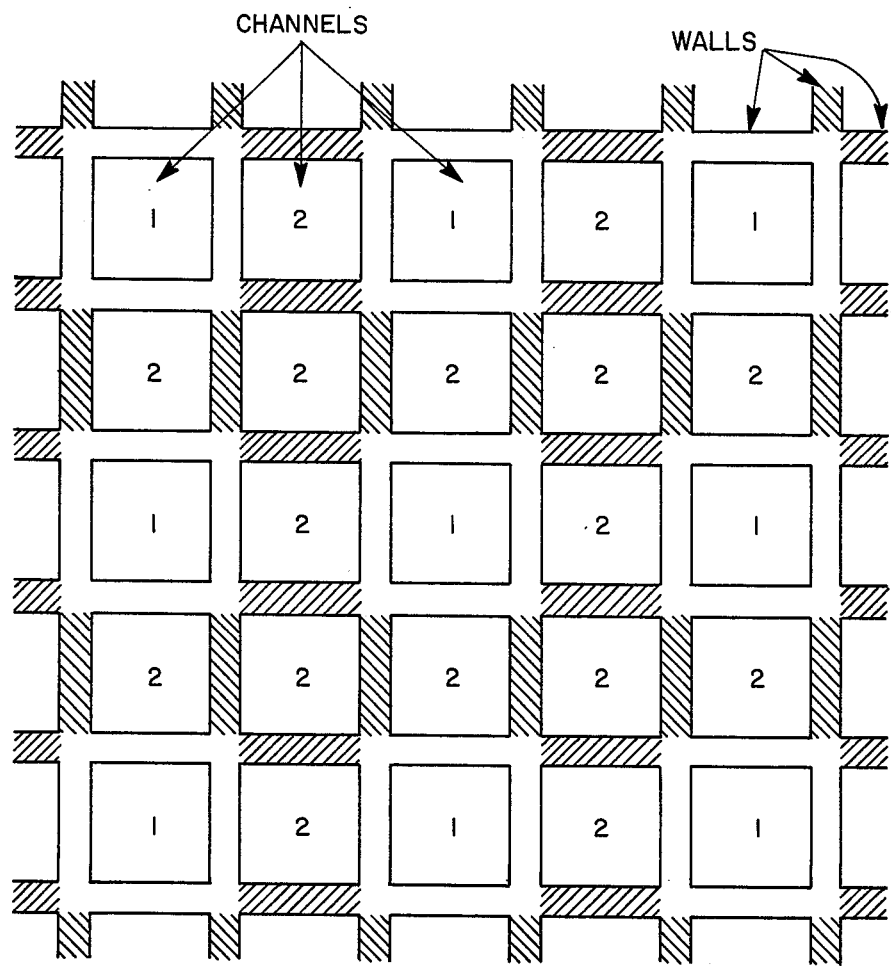
Figure 3:
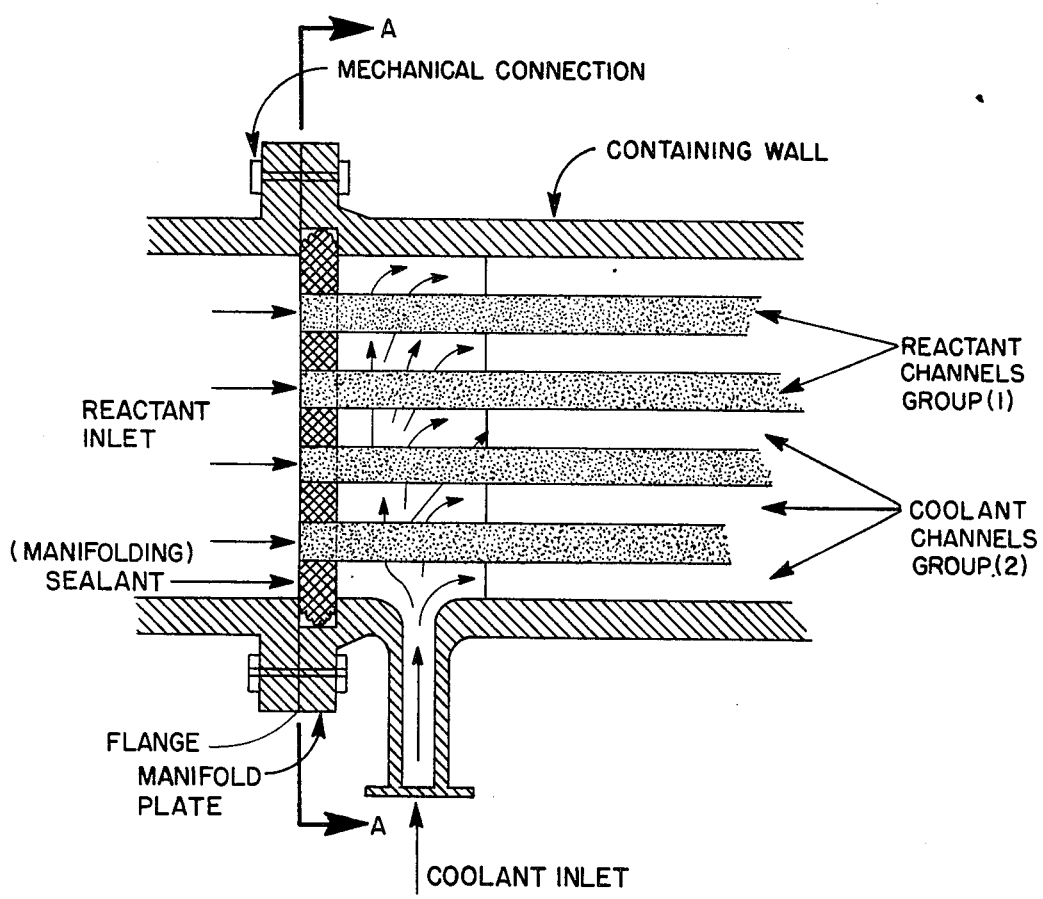
Figure 4:
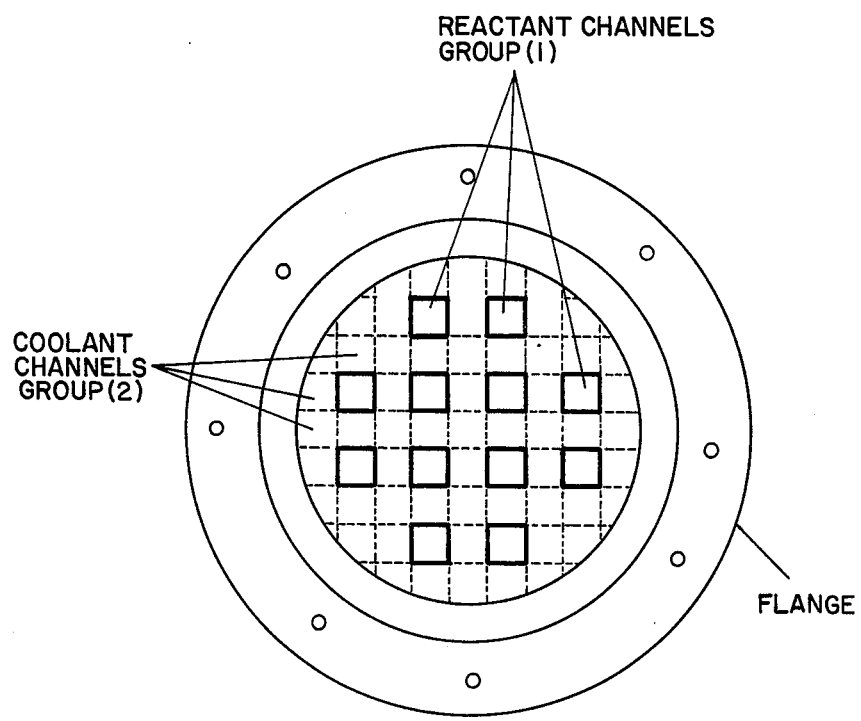

FIG. 1 illustrates a single end of an unmanifolded CHER reactor in an isometric view. For the sake of simplicity a square channel honeycomb is presented. It must be understood, however, that many different channel types are equally within the scope of the instant invention. FIG. 2 is an end view of an unmanifolded CHER reactor showing one of many possible arrangements of group one and group two channels where the channels have a square cross-sectional area. One or both of the open ends of the group one channels (at opposite ends of the honeycomb) are manifolded so as to form a separation of entrances of the extended group one channels as compared to the group two channels and the entire system is incorporated into an outer mechanical shell so as to facilitate fluid flow through group one and/or group two channels, thereby permitting the entry or exit of fluid in group one channels while preventing entry of such same fluid into the group two channels and thereby permitting the independent passage of different fluids through the different channel systems. The common walls which exist between adjacent channels of the different groups facilitate heat transfer from one channel group to another. The honeycomb structure with its mutually supporting, double cantilevered inner walls imparts strength to the overall system permitting the walls to be very thin and thereby being responsible for the low weight and rapid thermal response of the CHER configuration. The group one outward extending channels (from one or both ends of the honeycomb) are manifolded (at one or both ends) so as to create a single group. FIG. 3 shows a side view of such an arrangement for one end of a CHER configuration while FIG. 4 show an end view of FIG. 3 at A of the same type of configuration. Alternatively, the manifolding of the group one channels may be designed so as to create numerous independent group one channel systems while still being completely surrounded by the group two channel system, thereby permitting numerous independent reactions to proceed simultaneously and/or permitting more than two independent fluid flows to be conducted under varying conditions within a single chemical reactor and/or heat exchanger system. The interior walls of the channels of either or both groups of channels may be coated with a catalytic material converting that group of channels into a catalytic reactor. Thus, this reactor group is in intimate contact with the separately manifolded channels of the other group because of the common wall design and as a result, highly exothermic or endothermic reactions may be carried out under much greater temperature control than was possible in fixed bed or fluidized bed or countercurrent flow reactors. This greater temperature control can result in much greater product selectivity and/or yield for a wide variety of chemical reactions. Now heat can be removed or added to the reactor as required the temperature being regulated merely by careful control of the flow of reactants through the reactor channels and control of coolant or heat source flow through the coolant channels (when the group one channels are used as the reactant channels). The temperature control possible with this CHER system is extremely efficient because all the catalytic material in the reactor channels, where heat is either absorbed or liberated due to chemical reactions taking place, is on the surface of the walls that can transmit heat through the walls directly to the thermal control channels. That is to say most of the heat liberated or absorbed in the chemical reaction is conducted through the walls which support the catalyst and thereby eliminating the necessity for heat conduction through the gas phase which is a much less efficient way to cool a catalytic particle. In addition this CHER configuration allows not only most of the heat to be conducted through solid walls but also allows all the walls on which the catalysts reside to have all common walls with the coolant channels. Thus, one has an extremely uniform and precise method of controlling the catalyst temperature because no two catalytic surfaces share a common wall. Also, it is possible to fabricate a structure with very thin walls and this too contributes to greater efficiency and ease of temperature control. In traditional systems, the catalyst is on particles randomly packed into a reactor tube. Exothermic reactions occurring generate heat at the catalytic particles even in the center of the tube. This heat must migrate through the gas phase and through the particles in the reaction tube to the wall of the tube and only then pass through the wall to be dissipated in a coolant. This passage of heat through the reactor tube gas and particle phase before finally contacting the wall is responsible for the difficulty encountered in controlling the temperature in the reactors traditionally used.

In another embodiment of the CHER design, the channels of the group one channel system which have common walls with group two systems but not with other group one channels can be prepared so as to have permeable walls, these group one walls being coated with catalytic material on the inner surfaces for their entire length, part of their length or any combination of lengths desired. Different reactants each composed of one or more components, designated for the sake of convenience, $R_1$ and $R^2$, are fed into different channels of the group one channels and there are converted (either catalytically or thermally etc., into products, then these products permeate through the walls into the channel 2 system wherein they react further with each other resulting in the finally desired product. In this way, short-lived unstable intermediates can be efficiently introduced to each other without the need for going through difficult intermediate isolation steps.

In addition, such a system with permeable walls can be used to introduce different reactants in different group one channels to each other in the group two channels (or a third reactant already present in the group two channels) in a highly controlled manner such that the different reactant in the different group one channels (or the third reactant already present in the group two channels) are not comingled in high concentrations before the desired reaction is allowed to take place between the different reactants.

The honeycomb design because of its use of mutually supporting wall design, permits the preparation of very thin walls which would crack due to normally occurring stresses (be they mechanical, thermal, or chemical) if not mutually supported, i.e. if exposed or structurally independent. The thin walls and small internal diameters of the channels result in an extremely difficult system for carrying out reactions and transferring heat by giving rise to a high ratio of wall surface area, also referred to a geometric surface area, to reactor volume.

The honeycomb may be fabricated from glass, ceramics, or metals or combinations thereof. The ceramic material may be selected from the group consisting of mullite ($Al_6Si_2O_{10}$), cordierite ($Mg_2Al_4Si_5O_{18}$), alumina, silica, silicon carbide, silicon nitride, alkaline earth oxides, transition metal oxides, mixtures thereof, and glass. The metal may be selected from the group consisting of nickel, stainless steel, iron, aluminum, coppper, titanium, alloys and mixtures thereof. The glass material may be selected from a group consisting of fused silica, flint glass, sodalime glass, aluminosilicate glass, borosilicate glass, and mixtures thereof.

When using metals such as aluminum, it is possible to oxidize the entire unit to alumina ($Al_2O_3$) or oxidize it partially to alumina or oxidize selected channels or selected surfaces to alumina.

The channels of the honeycomb may be of any tesselation including triangles, squares, rectangles, hexagons, circles, diamonds, stars, etc. Squares and hexagons are preferred.

The channel walls may be of from 0.1 to 5.0 mm in thickness, preferably 0.1 to 0.3 mm, most preferably 0.15 mm. The channels may be of any length from 10 mm up to several meters, for example, 10 meters; however, length intermediate between these extremes is preferred for reasons of handling and also to insure sufficient length for any contemplated reaction or use. Lengths ranging from 2–300 cm, preferably 15–100 cm, most preferably 60 cm are contemplated.

The channels should have an internal diameter, calculated by using the hydraulic diameter as a measure in the following formula:

$$D_{(hyd)} = (4 \times \text{Channel Cross section area/Channel Perimeter})$$

of $D_{(hyd)}$ = 0.5 mm to 50 mm, typically 1–10 mm, preferably 1.5 mm. This is to insure a channel diameter of sufficient dimensions so that heat will have the shortest path possible to migrate to the walls, thereupon to diffuse through the walls into neighboring channels for dissipation and to insure wall surface area to support sufficient catalyst.

The channels of the different systems can be arranged in any pattern desired so long as every channel wall of the group one channel system, also referred to as the reacting channels, is in contact with at least one channel wall of the other channel system, also referred to as the coolant channels. This can be accomplished for example, by surrounding each channel of group one channels with channels of system two. This arrangement is illustrated in FIGS. 1 and 2.

The honeycomb may have any overall diameter so long as this overall diameter is at least 3 times the internal channel diameter as measured by the hydraulic diameter (i.e. insuring that every wall of the group one channels is contacted by channels of group two. The combined reactor-heat exchanger may have an overall diameter up to 1 meter or be 1 meter on a side). The channels of the honeycomb may be coated with catalytic material, such as those materials selected from the group consisting of Group VIII, Group VB, Group VIB, Group VIIB, Group IB, metals and oxides from the previously mentioned groups and mixtures thereof.

Alternatively, the channeled, manifolded honeycomb also referred to as the combined heat exchanger-reactor, may be used without any catalytic material, coated on the walls, purely as a heat exchanger or homogeneous reactor-heat exchanger. By proper choice of materials of construction, the heat exchanger can be designed to transmit both sensible heat by conduction and radiation heat due to photons in the IR, visible, and UV regions (provided the honeycomb construction material is transparent to such radiation.) In this way, many and different reactions can be performed using the manifolded honeycomb system of the instant invention.

The manifolded honeycomb system can be used in processes within the temperature ranges from $-200°$ C to $+1400°$ C depending on the process involved. Operating pressures can range from vacuum to 3000 psi.

The manifolded honeycomb combined heat exchanger reactors of this invention can be prepared by any of the following manufacturing techniques, extrusion and cutting the channels so as to create the different channel systems and manifolding the systems; and molding, cutting, manifolding, wherein manifolding includes both the sealant and the mechanical enclosure usually metal, glass or ceramic used to keep separate and direct the flow of the different fluids in group one and group two channels.

When extruding or molding, the honeycomb can be cut before or after any firing step needed to cure the honeycomb material.

Alternatively, the honeycomb can be extruded or molded with the different channel systems already present as extended and unextended channels and thus eliminate the necessity of cutting. The manifolding can be performed as an integral step in the molding or extruding process.

When manifolding (when manifolding is not performed as an integral step in the molding or extruding process) the extended channels are dipped into a readily removal material, be it liquid or solid to close the ends. The honeycomb is then dipped into a cement (e.g., epoxy or ceramic material) to a depth greater than the liquid or solid plugging material but to a depth less than the length of the unextended channels. This cement (e.g. epoxy or ceramic material) is allowed to harden and forms the separation barrier and manifold. The plugging material is then removed, for example only, by scrapping, abrasion, grinding, melting or burning so as to unplug the extended channels thereby yielding a honeycomb with channels of at least two different lengths separated from each other by a manifold barrier. This honeycomb and manifold barrier is then incorporated into a mechanical enclosure as illustrated in FIG. 3.

FIG. 3 represents one possible embodiment of the combined heat exchanger reactor (showing only one end). The honeycomb with channels of group one (extended) and group two is manifolded. In FIG. 3, the manifolding is described as sealant. This sealant or manifolding serves to separate the entrances of the channels of group one from those of group two. This manifolded unit is enclosed in a container, here described as a containing wall. This containing wall completely surrounds the entire manifolded honeycomb unit. The containing wall in FIG. 3 is shown with a coolant inlet or outlet, however, it must be understood that FIG. 3 represents only one end of a typical CHER unit. The other end, not pictured, can be viewed as a mirror image of the one described with the exception that the opening in that case are outlets or inlets. The containing wall is presented having its manifold plate mechanically connected to an extension. This is but one possible method which can be used to prepare a usable CHER. Alternatively, the containing wall and extender may be cast as one piece with the manifolded honeycomb being prepared in place. In yet another alternative the mechanical connector can be replaced with weldings, etc.

FIG. 4 is a view of FIG. 3 at A and demonstrates one method for enclosing the manifolded honeycomb and also clearly shows the channel arrangement with group one channels extending beyond the manifolding with group two channels being separated from group one channels by being behind the manifolding barrier.

CHER Used as a Chemical Reactor

The reactions can be catalytic (either heterogeneous or homogeneous) or not. If hetero-catalytic, the walls of one set of tubes, say the extended ones, are coated with an active catalyst as is done for auto exhaust honeycomb catalysts. The reactor then becomes a well manifolded bundle of small diameter, thin wall, tube-wall reactors. Each catalytic wall has reactants on one side and heat transfer medium on the other side.

Several conventional methods exist for controlling temperature in highly exothermic reactions including:
(1) Adiabatic reactors are operated at low conversions per pass, followed by cooling of the reactor effluent and recycle of the reactants to the reactor.
(2) Reactants are diluted with an inert substance which can absorb heat and so moderate the temperature rise.
(3) Catalyst pellets can be placed inside heat exchanger tubes with a coolant on the outside of the tubes. Heat must pass from the catalyst pellets to the gas and then to the tube wall, or from pellet to pellet to wall, or by a combination of these paths. Commercial reactors for oxidation of ethylene to ethylene oxide are of this type often with many thousands of tubes of about 1 inch diameter.
(4) Fluid bed reactors can be cooled with in-bed heat exchangers and/or by injection of cold solids.

(5) Cold shot cooling - another technique is accomplished by injecting cold fluid to cool the reactant stream.

The disadvantage of all these methods is that most or all of the generated heat leaves the catalyst particles by way of the gas film surrounding each particle. When reaction rates are rapid this insulating gas film causes the catalyst to become hotter than the surrounding gas. Thus, as catalytic activity increases, so does catalyst temperature. For many reactions, the increased temperature reduces yield and selectivity or causes a lower equilibrium conversion by LeChatelier's Principle, none of these being desirable. The high temperatures can also cause catalyst deactivation. For good control of catalyst surface temperature, it is therefore desirable to remove heat from the catalytic surface by some path in addition to the gas film.

In the novel reactor herein described, heat is removed from the catalyst through the gas film and through the tube wall to a coolant, and does not rely on heat conduction through the gas phase alone which allows the CHER configuration to be uniquely efficient in removing heat from and controlling the temperature of the catalyst.

The same analysis is equally valid for endothermic reactors, but instead of coolant one needs a heat-supplying fluid.

EXAMPLE

A combined heat exchanger-reactor was produced from a 35 square cells/cm² monolith made of cordierite. In this example, the monolith was produced by Corning Glass Works using the extrusion process; it was 7.6 cm long, had 0.15 mm thick walls and weighed approximately 19.8 grams. The walls were impervious to gas and liquid. The monolith was cut from a continuous circular extrudate such that it had a square cross section consisting of a square matrix of eleven rows and columns of complete cells.

A cut was made into each end of the honeycomb, parallel to the channel axes, using a 10 cm diameter diamond edged circular saw. The saw blade had a thickness of 0.35 mm which allowed the blade to cut between two channels (i.e. remove a channel) and not disturb the adjacent channel walls. The selected channels were cut away to a depth of approximately 1.3 cm. In this case every other column and every other row of channels were cut starting with the outside row and column of channels. This leaves uncut and extending outward from each end of the honeycomb block 25 channels. FIG. 1 shows the resulting structure; however, in this figure, only 9 extended channels are shown.

Both ends of the extended channels are sealed with Parafilm and placed inside of a thick walled glass jacket (2.54 cm ID × 7.62 cm). The jacket has two side arms, each located about 2.5 cm from each end. The jacket with honeycomb inside is placed vertically in a shallow dish, a potting material, Sylgard 184, silicone rubber was poured into the dish, and the Sylgard flows between the extended channels partially filling the spaces there. After the rubber hardens, the other end was similarly treated. The Parafilm was then removed.

A row of holes in the jacket midway between the ends allows a more viscous silicone rubber (GE RTV 106) to be flowed between the jacket and the outer wall of the honeycomb. This prevents bypassing of the shorter channels by the coolant stream.

An alternative to silicone rubber, especially for high temperature use, is a ceramic cement or mortar. It must have several properties including (a) the ability to flow readily between the extended channels, (b) a coefficient of thermal expansion close to that of the honeycomb to avoid stressing the extended channels as the temperature is changed, and (c) a low shrinkage on hardening to avoid stresses. Further, it must be stable in the reaction and coolant media. One material, Sauereisen No. 33, satisfied these requirements and has also been used in some of our reactors.

What is claimed is:

1. A one-piece integral, high strength combined heat exchanger reactor comprising a honeycomb possessing any regular repeating tesselation pattern of channels, wherein the channels are divided into a multiplicity of separate groups wherein one group of channels extends outward parallel to the direction of flow in the honeycomb, perpendicular to the cross-section of the honeycomb, each wall of this outwardly extending channel group being surrounded by and in contact through common walls with channels of a separate channel grouping, each channel of the outwardly extending group being separated from other channels of the same group by the presence of the intervening channels, which honeycomb system is manifolded and mechanically enclosed so as to form a separation of entrances of the extending channels as compared to the recessed channels of the separate group.

2. The apparatus of claim 1 wherein the honeycomb is prepared from material selected from the group consisting of glass, ceramic, metals and combinations thereof.

3. The apparatus of claim 2 wherein the honeycomb is prepared from a ceramic material selected from the group consisting of mullite, cordierite, alumina, silica, silicon carbide, silicon nitride, alkaline earth oxides, transition metal oxides and mixtures thereof.

4. The apparatus of claim 3 wherein the ceramic material out of which the honeycomb is made is cordierite.

5. The apparatus of claim 1 wherein the regular repeating tesselation pattern of the honeycomb is selected from the group consisting of triangles, squares, rectangles, hexagons, circles, diamonds.

6. The apparatus of claim 1 wherein the walls of the honeycomb are porous.

7. The apparatus of claim 5 wherein the regular repeating tesselation pattern of the honeycomb is selected from the group consisting of squares, hexagons, triangles and rectangles.

8. The apparatus of claim 1 wherein the walls of the honeycomb range from 0.1 to 5.0 mm in thickness.

9. The apparatus of claim 1 wherein the channels have an internal diameter, calculated using the formula:

$$D_{(hyd)} = (4 \times \text{Channel Cross section area/Channel Perimeter})$$

wherein $D_{(hyd)}$ is the hydraulic diameter, which ranges from 0.5 to 50 mm.

10. The apparatus of claim 1 further comprising a catalytic coating on the internal surfaces of the channels, the catalytic coating being selected from the group consisting of Group VIII, Group VB, Group VIB, Group VIIB, Group IB metals, metal oxides and mixtures thereof.

11. The apparatus of claim 1 further characterized in that the outwardly extending channels extend from both faces of the honeycomb.

12. The apparatus of claim 11 wherein both sets of outwardly extending channels are manifolded.

* * * * *